Feb. 14, 1956 R. SAVOIE 2,735,045
THREE-POSITION RELAY
Filed Feb. 27, 1953 4 Sheets-Sheet 1
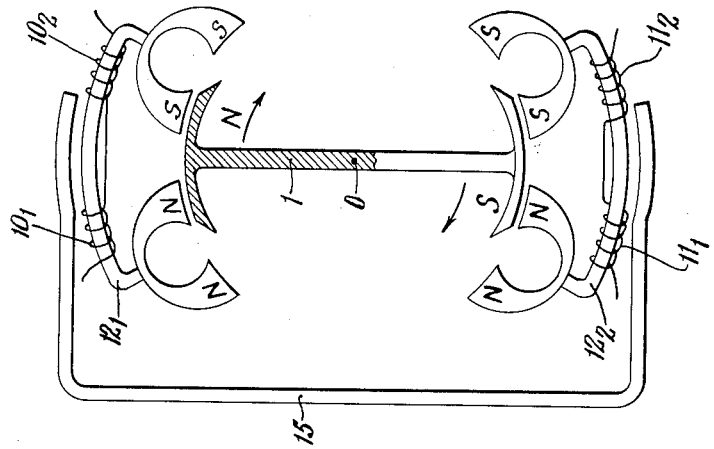
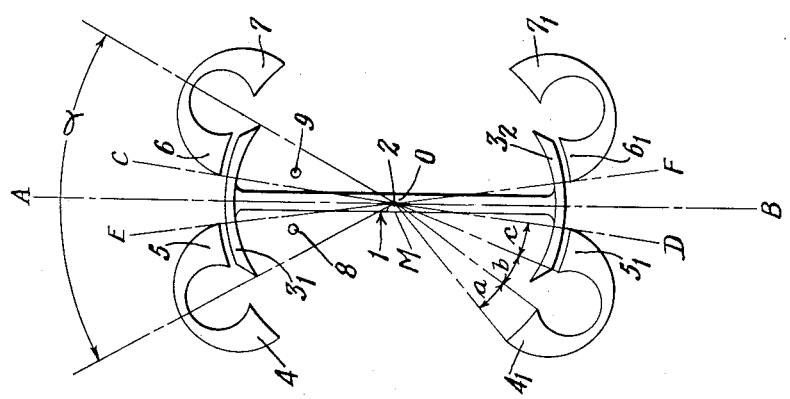
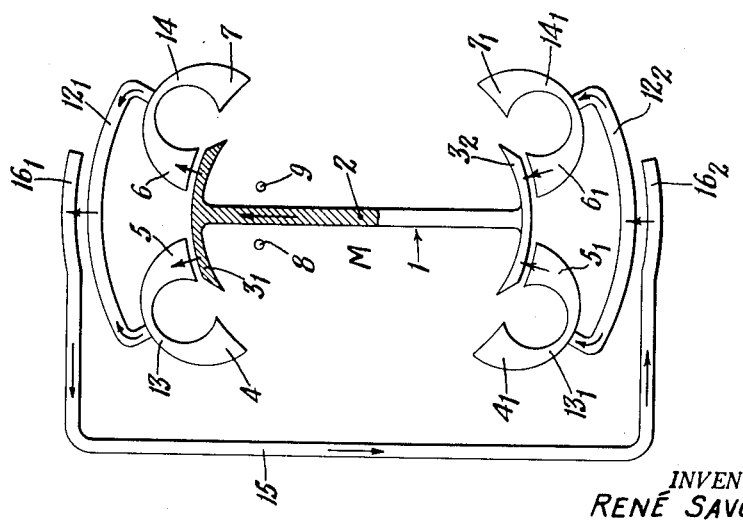
INVENTOR.
RENÉ SAVOIE
BY
Pollard and Johnston
ATTORNEYS

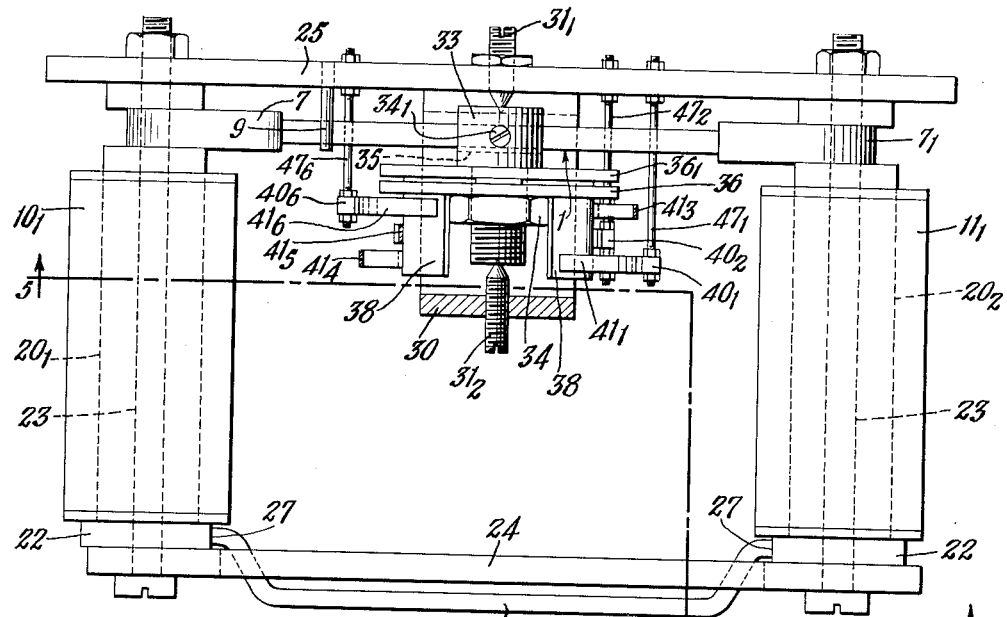
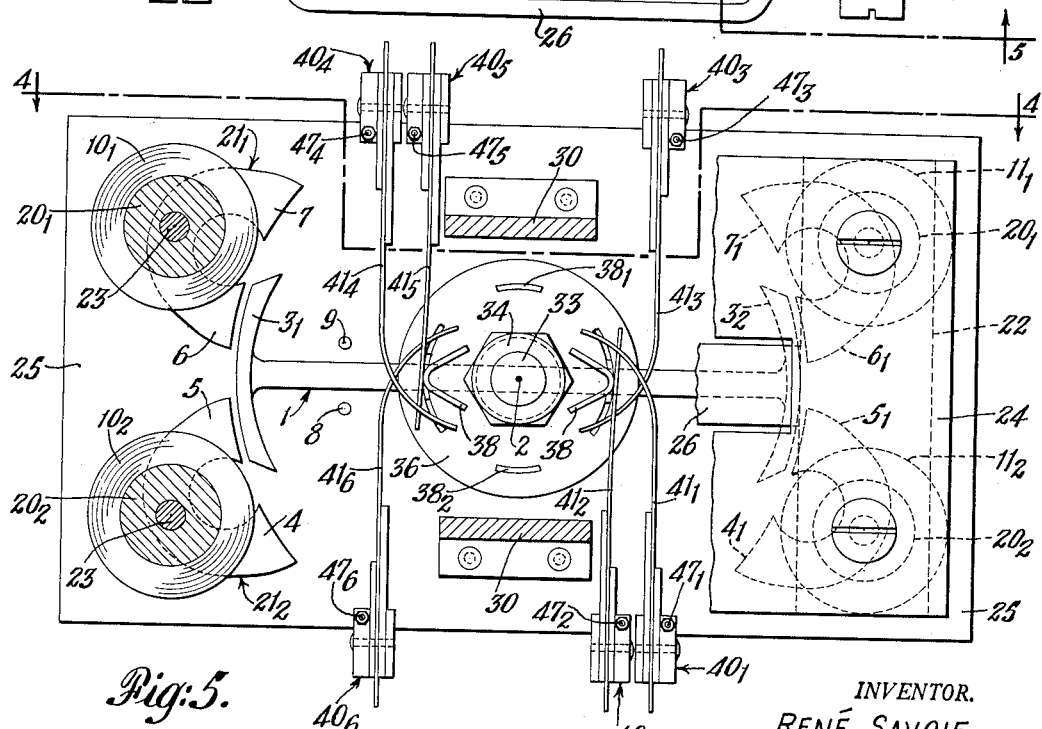

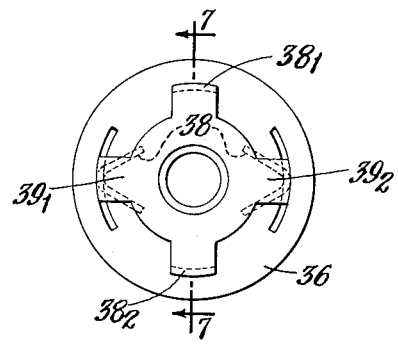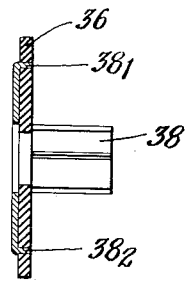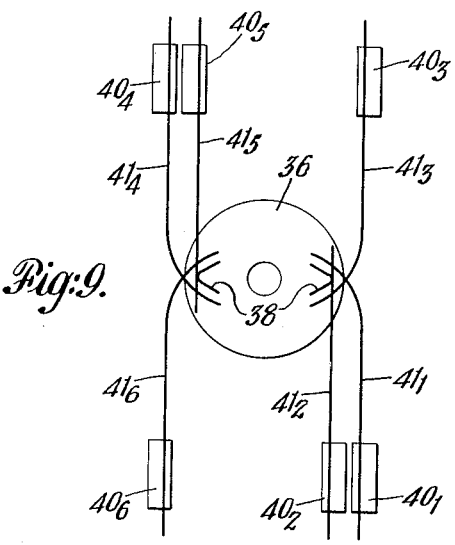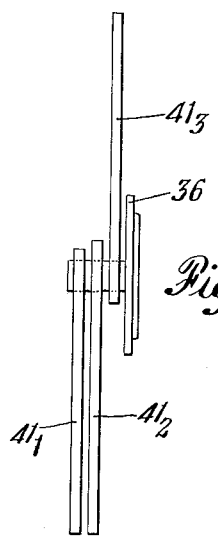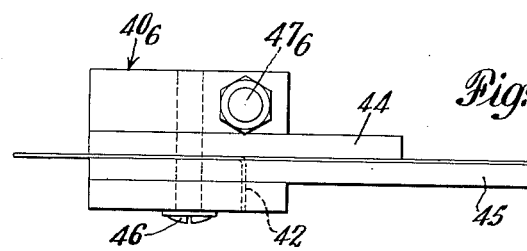
INVENTOR.
RENÉ SAVOIE

Feb. 14, 1956  R. SAVOIE  2,735,045
THREE-POSITION RELAY
Filed Feb. 27, 1953  4 Sheets-Sheet 4

INVENTOR.
RENÉ SAVOIE
BY
Pollard and Johnston
ATTORNEYS

United States Patent Office 2,735,045
Patented Feb. 14, 1956

2,735,045

THREE-POSITION RELAY

René Savoie, Sainte-Adresse, France

Application February 27, 1953, Serial No. 339,259

Claims priority, application France March 20, 1952

14 Claims. (Cl. 317—172)

The invention relates to electrical relays.

Summary

My improved relay comprises an oscillatory magnet and stationary magnet elements arranged to present a group of pole faces in proximity to the arc of swing of a pole face of the oscillatory magnet. The stationary magnet elements comprise two poles, each of which has a pair of spaced pole faces and coils or other magnetizing elements for inducing polarity in the stationary magnet elements to produce one polarity at one of the pairs of spaced pole faces and the opposite polarity at the other pair of spaced pole faces. The respective polarities are reversible in accordance with the direction of current flow in the magnetizing elements.

In accordance with a preferred form of my invention, the aforesaid pole face of the oscillatory magnet is substantially of a width to span two adjacent pole faces of the stationary magnet elements and the space between them.

In the specific embodiment of my invention as it will be described with reference to the accompanying drawings, the oscillatory magnet has a pair of diametrically opposed pole faces of opposite polarity and is pivotally mounted at approximately the mid-point between its pole faces. In this preferred embodiment the stationary magnet elements comprise eight spaced pole faces arranged in sets of four, one set being in proximity to the arc of swing of one pole face of the oscillatory magnet, and the other set in proximity to the arc of swing of the other pole face of the oscillatory magnet. The magnetizing elements for inducing polarity in the stationary magnet elements produce one polarity at one pair of adjacent pole faces of one of said sets and the opposite polarity at the other pair of adjacent pole faces of said one set, and produce in the pole faces of the respective pairs of the other set a polarity which is opposite to that of the diametrically opposed pairs of the first set.

The arrangement as described is one which is particularly well adapted to the construction of strong, simple, accurate, stable apparatus capable of performing switching operations for three distinct conditions of an electric circuit. A relay constructed in accordance with my invention reduces the air gap and minimizes the danger of sticking, thus avoiding certain problems encountered in the design and operation of polarized relays heretofore known and used. Other objects and advantages of the invention will appear as the description proceeds.

Description

In the drawings I have illustrated a relay which represents what I now consider to be the best mode of carrying out my invention. Also, I have included diagrams to illustrate the principle of operation of the invention and how it may be put to various uses.

Fig. 1 is a diagammatic view showing the magnetic circuit of the relay;

Fig. 2 is a diagram showing the different positions which can be occupied by the oscillatory magnet, or armature, of the relay of Fig. 1;

Fig. 3 shows, diagrammatically, the relay of Fig. 1 with magnetizing elements in the form of energizing windings for inducing polarity in the stationary magnet elements;

Fig. 4 is a side elevational view, partly in section, as indicated at 4—4 in Fig. 5, of a preferred construction of my relay;

Fig. 5 is a view of the same relay taken as indicated at 5—5 in Fig. 4 and thus being partly in horizontal section and partly in bottom plan to reveal most clearly the general arrangement of the stationary and oscillatory magnets together with the associated contact, or switching, elements;

Fig. 6 is a detail top view of the contact assembly associated with the oscillatory magnet;

Fig. 7 is a detail vertical sectional view taken as indicated at 7—7 in Fig. 6;

Fig. 8 is an enlarged detail view of one of the contact blocks shown diagrammatically in Fig. 9;

Fig. 9 is a diagrammatic view showing, in plan, the general arrangement of the several contact blocks in relation to the contact assembly associated with the oscillatory magnet;

Fig. 10 is a view illustrating, in elevation, the arrangement of the contact members;

Figure 11:
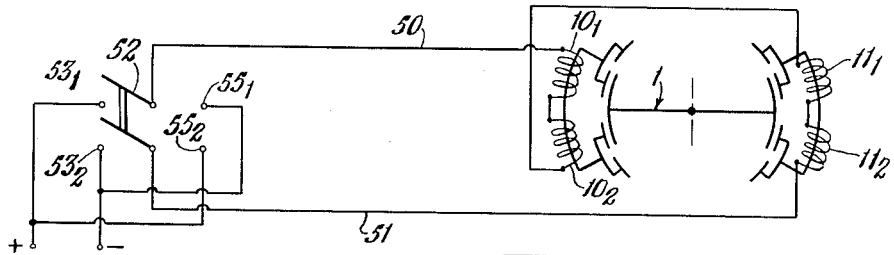
Fig. 11 is a circuit diagram of one arrangement of the relay as used for remote transmission.

Referring to Figs. 1 to 5 inclusive, my preferred relay construction is illustrated as comprising an oscillatory magnet 1 having a pair of diametrically opposed pole faces $3_1$ and $3_2$ of opposite polarity and being pivotally mounted at 2 at approximately the mid-point between its pole faces, stationary magnet elements 13, 14, $13_1$ and $14_1$ arranged to present a group of poles 4, 5, 6, 7, $4_1$, $5_1$, $6_1$ and $7_1$ with faces in proximity to the arc of swing of the pole faces $3_1$, $3_2$ of the oscillatory magnet. The stationary magnet elements thus comprise eight spaced pole faces arranged in sets of four, in proximity to the arc of swing of the respective pole faces of the oscillatory magnet. Magnetizing elements $10_1$, $10_2$, $11_1$ and $11_2$ (Figs. 3, 4 and 5) are arranged to produce polarity in the stationary poles in accordance with the direction of flow of current through the magnetizing coils. As shown in Fig. 3, the current flow is in a direction to produce a North polarity at one pair of adjacent pole faces of each set and South polarity at the other pair of adjacent pole faces of each set. The resultant magnetic forces of attraction and repulsion act to swing the oscillatory magnet in the direction of the arrows superimposed on this view. The magnetic forces at one pair of pole faces of each set attract the respective poles of the oscillatory magnet, and the magnetic forces at the other pair of pole faces of each set repel the respective poles of the oscillatory magnet. When the current flows in the other direction, the forces of attraction and repulsion are reversed and the oscillatory magnet is caused to swing in a direction opposite to that indicated by the arrows superimposed on Fig. 3.

The magnetic circuit which comprises the eight pole pieces 4, 5, 6, 7, $4_1$, $5_1$, $6_1$, $7_1$, operates with a magnetic shunt 15 having an adjustable gap which makes it possible to regulate the action of the relay and permit return of the oscillatory magnet to its central position of equilibrium represented by axis A—B in Fig. 2. The three positions of the oscillatory magnet are represented diagrammatically in this view by the aforesaid axis A—B, the axis C—D, and the axis E—F. The invention thus is useful in electrical installations and apparatus requiring a three-position polar relay and particularly in remote current transmission installations, temperature regulating or indicating apparatus, and installations for remote transmission of positions, and in insulation break indicators, irrespective of whether or not these installations are located in the plate circuit of an electronic amplifier.

Each pole face of the oscillatory magnet 1 has the shape of a circular arc and is symmetrical with respect to the longitudinal axis of the magnet. A pair of stops 8, 9 (Figs. 2 and 5) restrict movement of the oscillatory magnet 1 so that when it is positioned at the limit of its swing in either direction, the pole face $3_1$ covers one of the center pole faces 5, 6 of the group and partially overlaps the other center pole face. Thus the stop means 8, 9 restrict movement of the oscillatory magnet so that when the pole faces of the stationary magnet elements are deenergized with the oscillatory magnet positioned at the limit of its swing in either direction, the magnetic forces tending to return it to a central position exceed the magnetic forces tending to hold it to one side of its central position. In the absence of this stop means, if we assume a condition in which the pole face $3_1$ of the oscillatory magnet partially overlaps one of the outer pole faces 4 or 7, of the stationary magnet group, or set, when the stationary magnet is deenergized, then the magnetic forces induced by the oscillatory magnet after such deenergization of the stationary magnet would tend to hold the oscillatory magnet in its biased position. Thus the relay would "stick." However, when the stops 8, 9 are arranged as I have described, this objectionable condition will not be encountered.

The gap between the pole faces $3_1$, $3_2$ on the one hand and pole faces 4, 5, 6, 7, $4_1$, $5_1$, $6_1$, $7_1$ on the other hand is as small as possible. The length of the arc of a face $3_1$ or $3_2$ is such that it includes the arc of two consecutive stationary pole faces, for instance, 5 and 6 on the one side, and $5_1$, $6_1$ on the other side. Otherwise stated, the pole face $3_1$ is substantially of a width to span two adjacent pole faces of the stationary magnet elements and the space between them. It is desirable that the pole faces of the stationary magnet elements be substantially equally spaced. Also, in my preferred construction the pole faces of each set are of substantially equal width and of a width substantially equal to the width of the spaces between the pole faces. Thus the width of the pole faces of the oscillatory magnet will be substantially equal to three times the width of a stationary pole face. The pole faces $3_1$ of the oscillatory magnet have extending tips of generally arcuate form as can be seen clearly in Figs. 1, 2, 3 and 5 of the drawings. The magnetizing elements or windings $10_1$, $10_2$, $11_1$ and $11_2$ are mounted on cores $12_1$, $12_2$ connecting respectively pole faces 4, 5 to pole faces 6, 7, and pole faces $4_1$, $5_1$ to pole faces $6_1$, $7_1$. The pole pieces 4 and 5 are connected to each other by a core 13, the pole pieces 6 and 7 being connected by a core 14 (Fig. 1). Similarly, the pole pieces $4_1$, $5_1$ are connected by a core $13_1$, and pole pieces $6_1$, $7_1$ are connected by a core $14_1$. Core $12_1$ connects cores 13 and 14, while core $12_2$ connects cores $13_1$ and $14_1$. A magnetic shunt 15 may, if desired, be provided between cores $12_1$ and $12_2$ in order to modify the operating conditions in the direction desired.

Operation of the relay is as follows:

Without any external force the magnetized oscillatory magnet 1 will occupy the position shown in Figs. 1 and 2. By suitably connecting the ends of coils $10_1$ and $10_2$, and $11_1$ and $11_2$, north poles will be created at the pole pieces 4, 5 and $4_1$, $5_1$, and south poles at the pole pieces 6, 7 and $6_1$, $7_1$ when said windings are fed by an electric current, polarity being determined by the direction of flow of this current.

With the current flowing in the direction to create the polarity shown in Fig. 3, there is an attraction at the pole faces 6, 7 and a repulsion at the pole faces $6_1$, $7_1$. This produces a turning moment in the direction of the arrows superimposed on Fig. 3, bringing the oscillatory magnet into the position where its axis coincides with the axis C—D (Fig. 2). When the current in the energizing coils flows in the opposite direction, the turning moment will be in the opposite direction and the oscillatory magnet will swing into a position in which its axis coincides with axis E—F.

By reason of the provision of the stops 8 and 9, return of the oscillatory magnet to the axis A—B is assured as soon as the windings of the stationary magnet are deenergized, due to the magnetic flux induced by the oscillatory magnet in the central poles 5, 6, and $5_1$, $6_1$. The adjustment of the stop 9 is such that in case of clockwise movement of the oscillatory magnet, the distance between the stationary pole 5 and the left-hand tip of pole $3_1$ of the oscillatory magnet remains smaller than the distance between the stationary pole 7 and the right-hand tip of said pole. Similarly the adjustment of the stop 8 is such that in case of counter-clockwise movement of the oscillatory magnet, the distance between the stationary pole 6 and the right-hand tip of pole $3_1$ of the oscillatory magnet remains smaller than the distance between the stationary pole 4 and the left-hand tip of said pole.

From the foregoing it will be understood that when the stationary magnet elements are deenergized, the center poles 5, 6 and $5_1$, $6_1$ assure the return of the oscillatory magnet to the axis A—B. When the stationary magnet elements are energized, the oscillatory magnet swings in one direction or the other, depending upon the direction of the current. This action results primarily from the respective attractions and repulsions of the poles 4, 7 and $4_1$, $7_1$. Two diametrically opposed center poles also forcefully support this action, while the remaining two center poles have little, if any, effect. Thus, with the current flowing in the direction which produces clockwise turning of the oscillatory magnet, the poles 4, 5, 7, $4_1$, $6_1$ and $7_1$ cooperate in this turning movement, while the remaining two poles $5_1$ and 6 have no appreciable effect on the turning movement and do not have any harmful or antagonistic effect. The magnetic forces are balanced on opposite sides of the pivot 2 so as to reduce friction. Thus the oscillatory magnet in its movement is not required to overcome any antagonistic forces other than the frictional resistance of the pivots themselves. The pivots therefore can be made much smaller. By its design my relay makes it possible to obtain a reduction in the size of the gaps without creating any danger of sticking.

I consider it preferable that the angles $a$, $b$ and $c$ (Fig. 2) be equal. In the absence of the stops 8 and 9, the oscillatory magnet, depending on the orientation imparted to it by the external forces, could become stabilized in any one of the following three positions:

1. Opposite poles 4, 5, $6_1$ and $7_1$.
2. Opposite poles 5, 6, $5_1$ and $6_1$ (aligned on axis A—B).
3. Opposite poles 6, 7, $4_1$ and $5_1$.

The purpose of the stops 8 and 9 is to avoid stabilization of the oscillatory magnet in either of positions 1 and 3 above. The stops restrict the oscillatory movement of magnet 1 to an amount sufficient to produce the desired electrical switching operation when the stationary magnet elements are energized, this being an amount of movement such that when the stationary magnet elements are deenergized the oscillatory magnet can become stabilized only in the position in whch it is aligned with the axis A—B.

When there is no energization of the stationary magnets, the magnetism of the system is such that the intensity of the magnetic flux in the stationary poles facing the poles of the oscillatory magnet depends on the reluctance of the circuit 4, $12_1$, 15, $12_2$, $4_1$ and its symmetry with respect to the axis A—B (Figs. 1 and 3). The reluctance of this magnetic shunt is adjusted to insure return of the oscillatory magnet to its neutral axis A—B when the stationary magnet elements are deenergized. The arrangement is one which permits a very high magnetizing force and therefore a high turning moment. Adjustment of the value of the return moment which brings the oscillatory magnet back into alignment with the axis A—B is obtained by acting on the reluctance of the magnetic circuit 15 by varying the gap between $16_1$, $16_2$ and $12_1$, $12_2$ respectively (Fig. 1). With proper adjustment the sensitivity of the relay approaches that of laboratory measuring apparatus but is not so delicate to manufacture. The combined magnetic effects and the length of the oscillatory magnet cooperate in producing turning moments of values which yield high pressures at the electrical contacts, even with very small operating currents. Moreover relays constructed as I have described are largely independent of vibrations and free of other mechanical problems. The extreme sensitivity of my relay is believed to be due, among other things, to the following:

1. The gap can be reduced to an extremely small distance without danger of undesirable sticking such as frequently may be encountered with an ordinary polarized relay.

2. The relay is particularly well adapted to construction with long cores and coils in the stationary magnetic system which give high magnetizing forces per unit current in the magnetizing coils.

3. The oscillatory magnet can be balanced and pivoted with precision.

4. The return moment is positively controllable and not the result of stray flux as is the case in certain known constructions.

Proceeding with a further detailed description of my preferred construction:

Poles 4, 5, 6 and 7 shown diagrammatically in Fig. 1 consist of cylindrical cores $20_1$ and $20_2$ (Figs. 4 and 5) of an alloy having high permeability, having at their upper ends two U-shaped parts $21_1$ and $21_2$ which constitute the pairs of poles 4—5, 6—7, $4_1$—$5_1$ and $6_1$—$7_1$.

These cores $20_1$ and $20_2$ are assembled in pairs at their base by means of a yoke 22 also made of a metal alloy of high permeability and high saturation flux density. The cores of the yokes are traversed at their centers by rods 23 threaded at their ends which connect the pairs of cores to a base plate 24 of non-magnetic metal and to another plate 25 also of non-magnetic metal.

A second yoke 26 connects yokes 22 magnetically so as to bring about the magnetic shunt 15 of Fig. 1. The coupling reluctance between yokes 22 and yoke 26 is adjustable by the provision of brass shims 27 of suitable thickness.

The upper plate 25 receives a sleeve 30. In this sleeve and in a strap $30_1$ there are arranged screws $31_1$ and $31_2$ forming pivots for a non-magnetic supporting member 33. This supporting member bears the magnetized rod 1 and a set screw $34_1$, a soft metal shim 35 being interposed. The nut 34 fastens the insulating washers 36 and $36_1$. Washer 36 bears the contact piece 38 (Fig. 7). The contacts 38 are cut out from a phosphor bronze strip and arranged on the insulating washer 36 as shown in Figs. 6 and 7. Each contact is advantageously made of a disc bearing two diametrically opposite tenons $38_1$, $32_2$ which fit in corresponding cuts in the insulating washer 36 and, along a diameter perpendicular to that of the tenons, two rectangular extensions $39_1$, $39_2$.

These extensions, after being bent at 90° pass through the washer and are then back in the shape of a V.

The stationary contacts are arranged on the base plate 24 or on the upper plate 25 in the manner shown in Figs. 4, 5 and 9. These contacts are supported by contact bearing blocks, of which there are six in Figs. 5 and 9, namely $40_1$, $40_2$, $40_3$, $40_4$, $40_5$, $40_6$.

The blades of the contact blocks are located in different planes as shown in Fig. 10, this being obtained because of the respective height of the blocks. The contact blocks can be shifted in direction so as to adjust the distance from the moving contact member 38.

In order to make the diagram of Fig. 10 clearer, the contact blades of only the first plane, namely $41_3$, $41_2$, $41_1$, have only been shown.

Each contact block is made as indicated in Fig. 8 which shows block $40_6$ by way of example. It consists of the contact blade $41_6$ proper which has a tongue 42 bent at a right angle which engages in an orifice which passes through the blade-holding block $40_6$.

The purpose of this arrangement is to assure the fastening of blade 41 in the longitudinal direction during the movement of the elastic counter-blade 44, determining the active length of blade 41 as far as its elasticity is concerned. The elastic counter-blade 44 cooperates with a stop counter-blade 45 which strictly determines the position of the contact blade 41 with respect to the moving contact in its position of rest. Contact blade 41, the elasticity regulating counter-blade 44 and the stop counter-blade 45 are fastened on blade-holding block $40_6$ by a screw 46. A screw $47_6$ perpendicular to the latter (Fig. 8) passes through the contact block and fastens it to plate 24 or 25 of the relay. In the specific arrangement shown, screws 47, $47_2$, $47_3$, $47_4$, $47_5$ and $47_6$, fasten contact blocks $40_1$, $40_2$, $40_3$, $40_4$, $40_5$ and $40_6$, respectively, to plate 25.

Figs. 11 to 15 show electric circuits for certain applications of the relay among all those possible.

Fig. 11 gives the diagram of an installation for remote control by only two line wires 50 and 51, the three positions of the relay being determined by a reversing switch 52.

When switch 52 is in the central position shown in Fig. 11, no current flows through the windings and therefore the oscillatory magnet of the relay is aligned with axis A—B shown in Fig. 2.

When the switch makes contact with contacts $53_1$ and $53_2$, it sends a current from the direct current source 54 into windings $10_1$, $11_2$ and $11_1$, $11_2$ of the relay. This current through wire 50 and returning through wire 51, feeds the relay in one direction and causes its operation in the corresponding direction. When the switch makes connection with contacts $55_1$ and $55_2$ the current is sent in the opposite direction into windings $10_1$, $10_2$ and $11_1$, $11_2$ of the relay and the moving assembly moves in the opposite direction.

Figure 12:
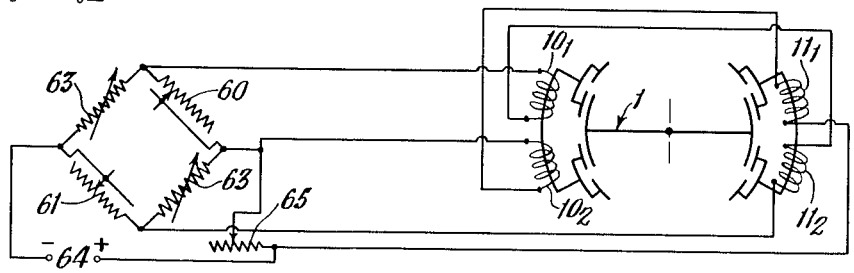
Fig. 12 is a circuit diagram showing the application of my relay for temperature regulation.

Fig. 12 shows a temperature control device. It comprises a Wheatstone bridge having two adjustable resistances 60 and 61 which establish the operating limits, and two resistances 62 and 63 which vary as a function of the temperature.

The windings of the relay are connected across the diagonal of the Wheatstone bridge formed in this manner, the other diagonal being fed by the direct current voltage supplied from a source 64.

The relay can be made more sensitive by the polarization effected by the bridge-feed current coming from the source 64. This polarization is increased by an adjustable electrical shunt 65 connected across the terminals of one of the pairs of windings $11_1$ and $10_2$. The direction of the connections is such that the magnetization resulting therefrom is additive and has the same sign of variation as that caused by the unbalance current of the bridge.

Figure 13:
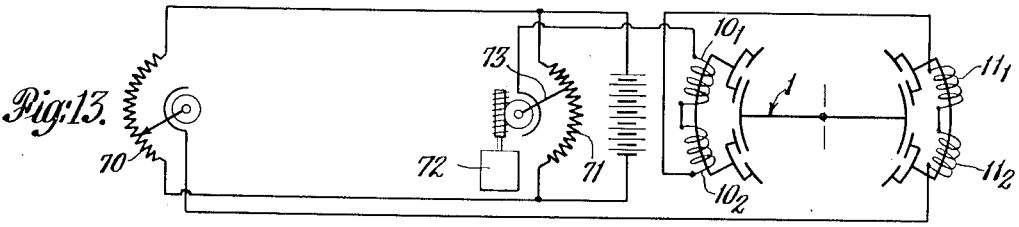
Fig. 13 is a circuit diagram showing another application of my invention for remote transmission.

The arrangement of Fig. 13 shows an installation for the remote transmission of positions. An angular or linear displacement is reproduced at a distant location by the system consisting of two potentiometers 70, 71.

The contacts of the relay control the reversing and stopping of the motor mechanism 72 acting on the position of slide 73 of potentiometer 71.

Figure 14:
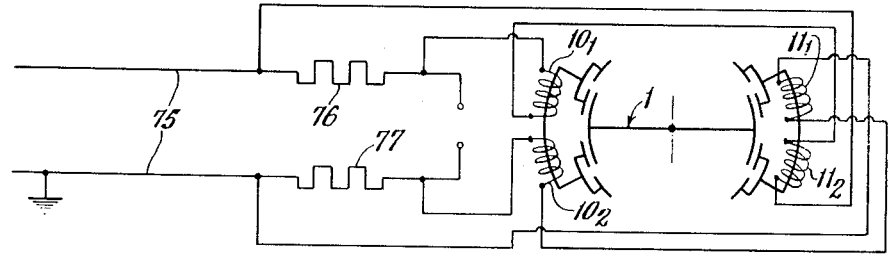
Fig. 14 is a circuit diagram showing the application of my relay to an insulation indicator.

Fig. 14 shows an insulation break indicator. A direct current line 75 is provided at its terminals with two shunts 76 and 77. Each of these shunts is connected to a pair of windings $10_1$, $11_1$ on the one hand and $10_2$, $11_2$ on the other hand in such a direction that the magnetizations resulting from the passage of current as a result of the difference in potential at the terminals of the shunts are in opposition.

When the line is well insulated, the resultant field is zero, the voltages at the terminals of the shunts being equal and the windings being in opposition, then the relay is at rest. When, as a result of breaks in the insulation, a leakage current results on a line, the value of the difference in potential at the terminals of one shunt of a pair of windings exceeds the value of the difference of potential of the shunt on the other pair; there results a polarization and a movement of the relay in a direction dependent on the defective line conductor.

The same result can be obtained with alternating current by means of small bridge rectifiers between the terminals of the shunts and the terminals of the windings.

Figure 15:
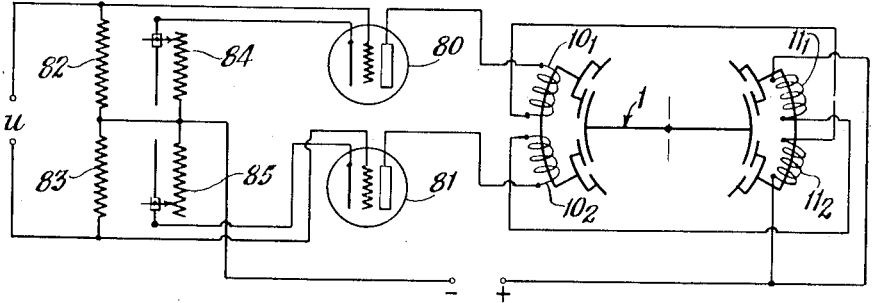
Fig. 15 is a circuit diagram showing the utilization of my invention in an amplifying circuit.

Fig. 15 shows the use of the relay in an amplifying circuit.

This amplifying circuit comprises two electron tubes 80 and 81 in the plate circuits of which there are inserted two pairs of coils $10_1$, $11_2$, for one of the plates and $10_2$, $11_1$ for the other plate. As the vacuum tubes are identical with a suitable direction of connection, the resultant field will be zero.

If a difference in potential appears on the grid resistances 82 and 83, depending on its sign, the plate current increases in tube 80 and decreases in the other tube 81 or vice versa. The two effects are additive in the stationary magnetic circuits of the relay which become polarized and move the armature in a direction depending on the direction of application of the difference in potential to the resistances 82 and 83. The variable cathode resistances 84 and 85 permit the adjustment of the bias on the electron tubes and thus can be made to compensate for small asymmetries. The relay windings are designed to present a load impedance suitable for the characteristics of the vacuum tubes used.

The terms and expressions which I have employed are used in a descriptive and not a limiting sense, and I have no intention of excluding such equivalents of the invention described, or of portions thereof, as fall within the purview of the claims.

I claim:

1. An electrical relay comprising an oscillatory magnet and stationary magnet elements arranged to present a group of pole faces in proximity to the arc of swing of a pole face of the oscillatory magnet, said stationary magnet elements comprising two poles each of which has a pair of spaced pole faces, magnetizing elements for inducing polarity in said stationary magnet elements to produce one polarity at one of said pairs of spaced pole faces and the opposite polarity at the other of said pairs of spaced pole faces, the respective polarities being reversible in accordance with the direction of current flow in said magnetizing elements, said pole face of the oscillatory magnet being substantially of a width to span two adjacent pole faces of the stationary magnet elements and the space between them.

2. An electrical relay constructed as defined by claim 1, in which the pole faces of said group are substantially equally spaced.

3. An electrical relay constructed as defined by claim 1 and including stop means to restrict movement of said oscillatory magnet so that when said pole faces of the stationary magnet elements are de-energized with said oscillatory magnet positioned at the limit of its swing in either direction, the magnetic forces tending to return it to a central position exceed the magnetic forces tending to hold it to one side of said central position.

4. An electrical relay constructed as defined by claim 1, in which the pole faces of said group are substantially equally spaced, and which includes stop means to restrict movement of said oscillatory magnet so that when said pole faces of the stationary magnet elements are deenergized with said oscillatory magnet positioned at the limit of its swing in either direction the magnetic forces tending to return it to a central position exceed the magnetic forces tending to hold it to one side of said central position.

5. An electrical relay constructed as defined by claim 1 and including stop means to restrict movement of said oscillatory magnet so that when it is positioned at the limit of its swing in either direction said pole face of the oscillatory magnet covers one of the center pole faces of said group and partially overlaps the other center pole face.

6. An electrical relay constructed as defined by claim 1, in which the pole faces of said group are substantially equally spaced, and which includes stop means to restrict movement of said oscillatory magnet so that when it is positioned at the limit of its swing in either direction said pole face of the oscillatory magnet covers one of the center pole faces of said group and partially overlaps the other center pole face.

7. An electrical relay comprising an oscillatory magnet having a pair of diametrically opposed pole faces of opposite polarity and being pivotally mounted at approximately the mid-point between said pole faces, stationary magnet elements arranged to present a group of pole faces in proximity to the arc of swing of the pole faces of the oscillatory magnet, said stationary magnet elements comprising eight spaced pole faces arranged in sets of four, one set in proximity to the arc of swing of one pole face of the oscillatory magnet and the other set in proximity to the arc of swing of the other pole face of the oscillatory magnet, and magnetizing elements for inducing polarity in said stationary magnet elements to produce one polarity at one pair of adjacent pole faces of one of said sets and the opposite polarity at the other pair of adjacent pole faces of said one set and to produce in the pole faces of the respective pairs of the other set a polarity which is opposite to that of the diametrically opposed pairs of the first set.

8. An electrical relay constructed as defined by claim 7, in which the pole faces of each set are substantially equally spaced.

9. An electrical relay constructed as defined by claim 7 and including stop means to restrict movement of said oscillatory magnet so that when said pole faces of the stationary magnet elements are de-energized with said oscillatory magnet positioned at the limit of its swing in either direction the magnetic forces tending to return it to a central position exceed the magnetic forces tending to hold it to one side of said central position.

10. An electrical relay constructed as defined by claim 7, in which the pole faces of each set are substantially equally spaced, and which includes stop means to restrict movement of said oscillatory magnet so that when said pole faces of the stationary magnet elements are deenergized with said oscillatory magnet positioned at the limit of its swing in either direction the magnetic forces tending to return it to a central position exceed the magnetic forces tending to hold it to one side of said central position.

11. An electrical relay constructed as defined by claim 7, in which the pole faces of each set are of substantially equal width and in which said width is substantially equal to the width of the spaces between the pole faces of each set.

12. An electrical relay constructed as defined by claim 7, in which the pole faces of each set are of substantially equal width and in which said width is substantially equal to the width of the spaces between the pole faces of each set, the width of the pole faces of the oscillatory magnet being substantially equal to three times the width of a stationary pole face.

13. An electrical relay constructed as defined by claim 7, in which the pole faces of the oscillatory magnet have extending tips of generally arcuate form.

14. An electrical relay constructed as defined by claim 7, in which the pole faces of the oscillatory magnet have extending tips of generally arcuate form, said latter pole faces being substantially of a width to span two adjacent pole faces of the stationary magnet elements and the space between them.

References Cited in the file of this patent

UNITED STATES PATENTS

| | | |
|---|---|---|
| 496,648 | Gregory | May 2, 1893 |
| 558,256 | Bush | Apr. 14, 1896 |

FOREIGN PATENTS

| | | |
|---|---|---|
| 231,953 | Switzerland | Apr. 30, 1944 |